Figure 1:
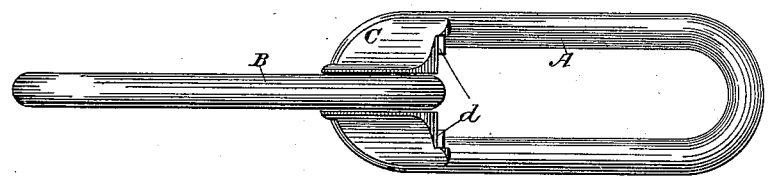

(No Model.)

J. M. DODGE.
CHAIN CABLE.

No. 361,865. Patented Apr. 26, 1887.

Witnesses:
W. J. Graham
H. Hansen

Inventor.
Jas. M. Dodge.
By J. N. McIntire
Attorney.

UNITED STATES PATENT OFFICE.

JAMES M. DODGE, OF PHILADELPHIA, PENNSYLVANIA, ASSIGNOR TO THE EWART MANUFACTURING COMPANY, OF CHICAGO, ILLINOIS.

CHAIN CABLE.

SPECIFICATION forming part of Letters Patent No. 361,865, dated April 26, 1887.

Application filed March 5, 1887. Serial No. 229,740. (No model.)

*To all whom it may concern:*

Be it known that I, JAMES M. DODGE, of Philadelphia, county of Philadelphia, and State of Pennsylvania, have invented a new and useful Improvement in Chain Cables; and I do hereby declare that the following is a full, clear, and exact description thereof, reference being had to the accompanying drawings, making part of this application.

My invention relates especially to that species of chain cable in which the links are indirectly articulated or connected through the medium of interposed removable bearing or wearing blocks, which afford a larger wearing-surface than is possible in that species of chain cable in which the links are coupled directly one with another.

In Letters Patent granted to me September 12, 1882, No. 264,139, will be found shown and described a chain cable of the species on which my present invention is an improvement. In the chain cable patented to me as aforesaid the semicircular ends of two adjacent links of the chain take their bearings, respectively, in correspondingly-shaped grooves or saddle-like bearing-surfaces that are arranged transversely to each other in an interposed piece or block, and the mode of operation is such that in passing over any wheels in connection with which the chain may be used the semicircular end of one or the other of every two links (according to the direction in which the chain is laterally bent) must slide or turn in frictional contact with the correspondingly-shaped groove or saddle-like bearing to which it is fitted. This necessary mode of operation produces, of course, a substantially equal amount of wear on the saddle-like bearing-surfaces of the blocks and the interior semicircular surfaces or end portions of the links.

My present invention has for its object to avoid or overcome the wear thus occasioned in the links themselves, (which of course constitute the most important and expensive part of the chain structure,) and this desired object I have attained by the employment of curved bearing-pieces or bushings made of any suitable metal or material, arranged in such a manner, in conjunction with the link ends and the interposed metallic blocks, as to render the chain capable of operation without the slightest friction on any portion of the link.

My present invention may therefore be said to consist, essentially, in the combination, with the links and interposed wearing-blocks of a chain cable of the species patented to me, as aforesaid, of bearing-pieces or bushings which practically constitute linings to the interior portions of the semicircular ends of the links, and that move with the links and in frictional contact with the saddle-like surface of the grooves of the bearing-blocks, all as will be hereinafter more fully explained, and as will be particularly pointed out and defined in the claim of this specification.

To enable those skilled in the art to which my invention relates to make and use my improved chain cable, I will now proceed to more fully describe my invention, referring by letters to the accompanying drawings, which form a part of this specification, and in which I have shown my invention carried out in that form in which I have so far successfully practiced it.

Figure 2:
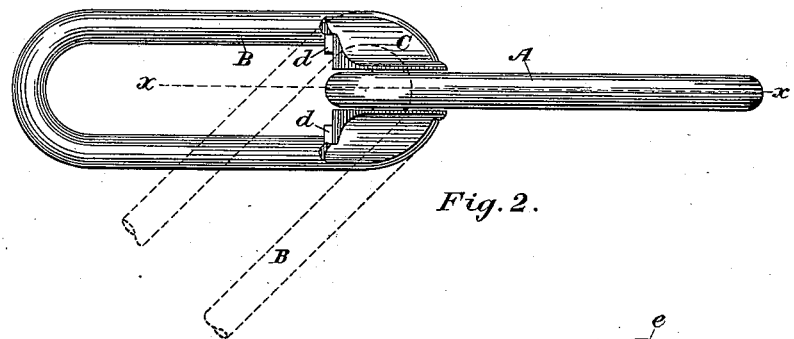
Figure 4:
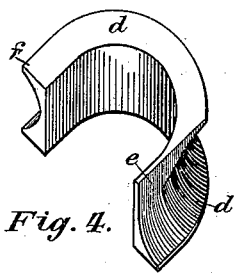
Figure 3:
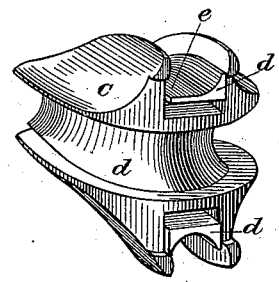
Figure 5:
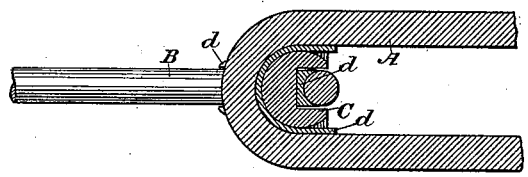

In the drawings, Figure 1 is a top or plan view of two links of a chain made according to my present invention. Fig. 2 is a side view or elevation of the parts illustrated at Fig. 1. Fig. 3 is a perspective view, on a somewhat enlarged scale, of the bearing or wearing block and the bushings or linings of the link ends detached from the links of the chain. Fig. 4 is a perspective view of one of the metallic bushing pieces or linings separated from the other parts seen at Fig. 3. Fig. 5 is a partial horizontal section at the line *x x* of Fig. 2.

In the several figures the same part will be found designated by the same letter of reference.

A and B represent two of the links of a chain cable, each of which has semicircular ends, as shown, and C is the bearing or wearing block, which is interposed between the coupled ends of the two links in substantially the manner made the subject of my patent before mentioned, but which links and bearing-block have combined with them, as I will presently explain, bearing-pieces or bushings *d*, the preferable shape of each of which is clearly shown in the drawings.

Each one of the bearing-pieces or bushings *d* is shaped so as to accommodate or seat within its peripherally-grooved face the interior surface or portion of the semicircular end of one of the chain-links, and so that its leg-like extensions at *e* and *f* will prevent any turning movement of the bushing, (in the plane of the link,) thus enforcing the movement of the bushing with the semicircular link end whenever the bushing shall have been properly placed within the end of the link and the latter drawn taut and pulled home to a bearing against the saddle-like portion of the block C.

Preferably each of the bushings *d* has its internal face or peripheral surface made straight in cross-section of the bushing, so as to conform to the square saddle-like grooves in the bearing-block C.

By reference to Fig. 5 it will be seen that the saddle-like groove or seat in the block C is rectangular in cross-section, and that the bearing or wearing face of the bushing *d* conforms to the groove thus shaped, while the peripheral groove in the bushing itself, in which the end of the link B is seated, is semicircular in cross-section, to correspond with the cylindrical shape (in cross-section) of the stock composing the link end.

To permit the removal and replacement of each of the bushings *d* whenever necessary for the purpose of their renewal, &c., the peripheral flange-like portion of each of said bushings is cut away or slipped off at one side of the bushing, as seen at *e*.

When the two links, with the two bearing-pieces or bushings *d* and the block C, are arranged and put together in the manner clearly shown at Figs. 1, 2, and 5, the mode of operation of the parts, it will be seen, is such that on turning either of the links relatively to the other—for instance, as indicated by the changed position of link B in dotted lines at Fig. 2—the bushing *d*, connected with said link B, will inevitably turn bodily with the link during its oscillatory movement about the axis of the articulation of the chain, so that the whole wear or surface of frictional contact will occur between the exterior or saddle-like surface of the block C and the contiguous surface of the bushing *d*. Thus during all the relative movements of the links of a chain made, as shown and described, with the interposed bushings or lining-pieces *d*, not the slightest frictional wear can come upon any portion of any one of the links A and B of the chain.

Whenever it may be necessary, in order to renew or replace any of the worn parts, (or for any other purpose,) to separate the links, the blocks C, and the two bushings *d*, it is only necessary (as in the case of my patented chain before mentioned) to back the links A and B relatively—*i. e.*, move their adjacent or coupled ends away from each other in the direction of the length of the chain, when, by the proper manipulation, the blocks C may be removed in substantially the same manner as in the case of my patented chain structure, and by a reverse mode of manipulation duplicate or new bushings or blocks C, or both, may be resupplied to the links of the chain.

It will be understood, of course, that although I have shown the blocks C with the saddle-like grooves of the form indicated at Fig. 5, some other form of bearing-groove may be employed and the bushing *d* correspondingly changed in shape. It will also be understood that although the shape of bushing shown, with the leg-like extensions *f*, for the purpose of enforcing the turning of the bushing with the curved end of the link, is the form I prefer, the said bushings may be made to move bodily with the links, with which they are combined, by some other means than the leg-like extensions referred to, and that although the cut-away of one of the peripheral flanges at *e* is shown as the preferable means for permitting the easy detachment or removal of each of the bushings from the rest of the structure, this end may be accomplished in some other way; or in case where it may not be deemed desirable or necessary to have these bushings removable, they may be made otherwise and permanently combined with the ends of the links.

Having now sufficiently explained the construction and operation of my improved chain cable to enable those skilled in the art to carry out my present invention, either in the precise form of chain cable shown or in some other involving the principle of my improvement, what I claim as new, and desire to secure by Letters Patent, is—

In combination with the links A and B of a chain cable, an interposed or intermediately-arranged metallic block, C, and suitable bushing-pieces or linings, *d*, which move with the articulated ends of the chain-links, and which bear upon and move relatively to the saddle-like seats or bearing-surface of said interposed block, all substantially in the manner and for the purpose hereinbefore set forth.

In witness whereof I have hereunto set my hand this 2d day of March, 1887.

JAMES M. DODGE.

In presence of—
D. T. GROFF,
D. E. KERN.